United States Patent [19]

Chaborski et al.

[11] 4,441,107

[45] Apr. 3, 1984

[54] MEASURING ARRANGEMENT HAVING A PLURALITY OF MEASURING POINTS CONNECTED TO ONE ANOTHER BY MEANS OF A CABLE

[75] Inventors: Hoiko Chaborski, Munich; Walter Mehnert, Ottobrunn, both of Fed. Rep. of Germany

[73] Assignee: MITEC Moderne Industrietechnik GmbH, Ottobrunn, Fed. Rep. of Germany

[21] Appl. No.: 270,391

[22] Filed: Jun. 4, 1981

[30] Foreign Application Priority Data

Jul. 8, 1980 [DE] Fed. Rep. of Germany ....... 3025837

[51] Int. Cl.³ .............................................. H04Q 5/00
[52] U.S. Cl. ............................... 340/870.16; 340/596;
340/825.08; 340/870.17
[58] Field of Search ...................... 340/870.16, 870.17,
340/825.07, 825.08, 596

[56] References Cited

U.S. PATENT DOCUMENTS 2,839,737  6/1958  Dalglish ........................ 340/870,17
3,211,000 10/1965  Childs ............................ 340/870.17
4,100,533  7/1978  Napolitano et al. ........... 340/825.08

Primary Examiner—Glen R. Swann, III

[57] ABSTRACT

A measuring cable with spaced measuring stations is laid. The measuring stations each have a sensor whose electrical conductivity depends on an ambient variable such as temperatures light etc., each sensor is provided with a control arrangement which, due to a transmitted signal from a control center, connects its sensor to a constant current source and returns a signal indicative of any voltage change dependent on the variable ambient which signal is measured by the control center. The measuring cable is divided into sections each having a selectable circuit which can be selected individually by the control center. A clock pulse signal is transmitted to all measuring stations but is only active for the cable section which has been selected. In this manner, the cable section can be chosen as desired, the time required for the control center to have access to certain measuring stations is shortened and semiconductor switches can be used because measurements are only made in the steady state.

30 Claims, 10 Drawing Figures

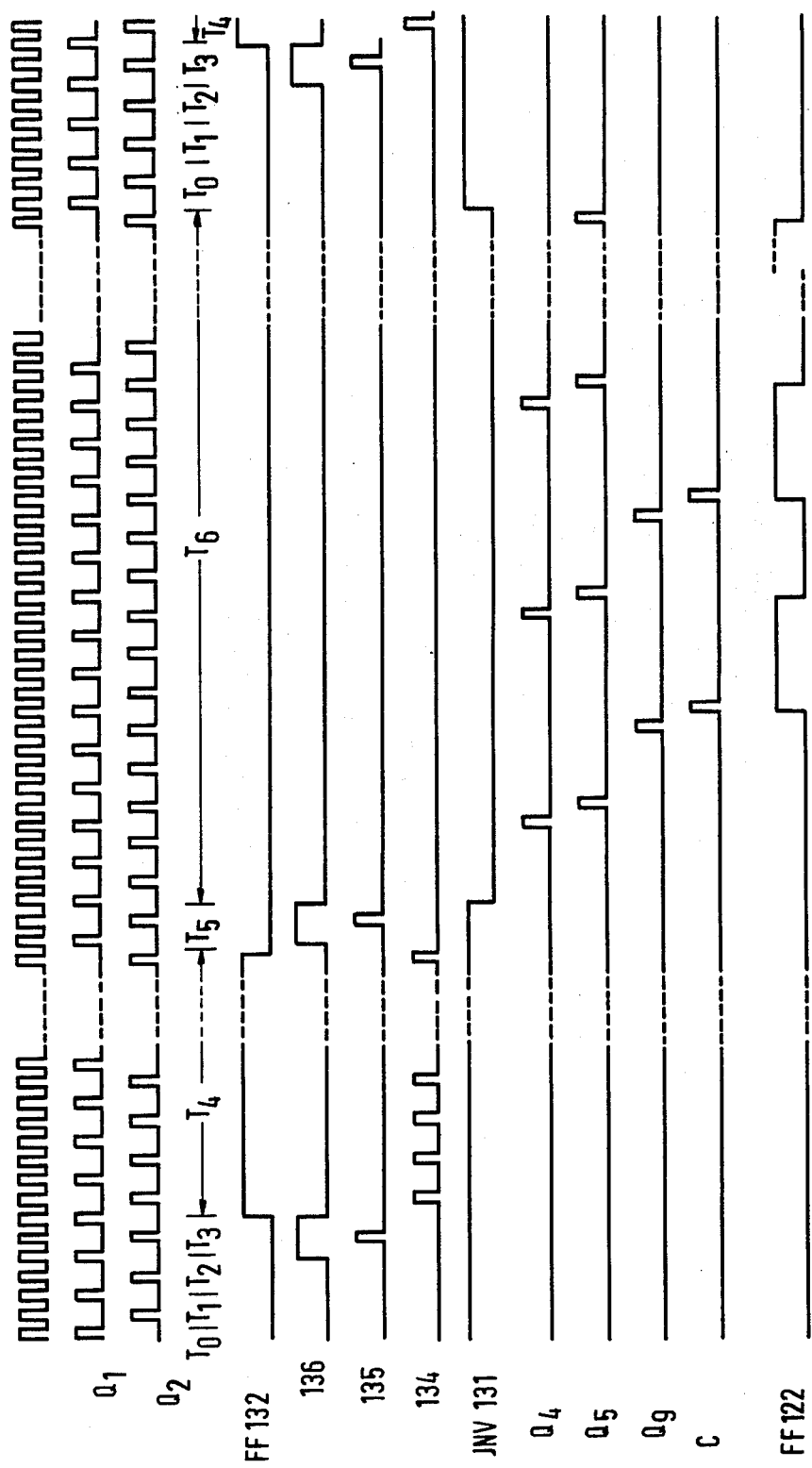

MEASURING ARRANGEMENT HAVING A PLURALITY OF MEASURING POINTS CONNECTED TO ONE ANOTHER BY MEANS OF A CABLE

BACKGROUND OF THE INVENTION

This invention relates to apparatus for detecting and measuring leaks in heating pipes and the like.

From the German published application No. 2,800,185 it is known to equip measuring stations with thermistors acting as sensors and to lay a measuring cable equipped in this manner along a heating pipeline in order to monitor the occurrence of any leakage point causing heat loss and, if necessary, to be able to exactly locate such leakage points. This is carried out by measuring in the control centre any variation of the temperature gradient between two adjacent measuring stations and evaluating them for fault detection.

The absolute value of the ambient temperature at the respective measuring stations or measuring points during each individual measuring operation is of small importance since it changes very often due to the effects of aging and weather, e.g. changing intensities of sunshine. One therefore proceeds in such a manner that the newly obtained values measured at the respective measuring points, one after the other, are compared with the so-called set values assigned to these measuring points. These set values are adapted to the generally changing ambient conditions in that measurements are taken at the measuring points over and again and are stored as new set values for the next period when such deviations from the old set values are determined as having been caused by a "global" temperature change, i.e. over large sections of the heating pipeline.

It is possible to apply the inventive measuring arrangements to other fields of application when other transducer components or circuits are inserted instead of the thermistors, into each measuring point. These substituted components or circuits may change their electric resistance dependent, for instance on the ambient pressure, the ambient degree of brightness, the ambient humidity, etc. It is also by no means necessary that all measuring points be equipped with the same sensors. By way of example, in a building complex comprising numerous rooms, it is possible to install an inventive measuring arrangement and thereby to monitor in each room the temperature, humidity, the operational state of the lights, the development of smoke, etc., in which case a measuring point is provided in each of the rooms for each of these physical ambient parameters and the measuring point is provided with an appropriate sensor. All these measuring points can be connected to one another in series by the cable of the measuring arrangement and can be scanned one after the other by the control and measuring centre.

In many cases the set values used for the purpose of comparison with the individually measured values may also be determined in a manner other than has been described hereinbefore with respect to temperature.

Thus, for example, for checking the state of operation of the room lights, a set value is fixed for the daytime or hours of work which corresponds to a higher degree of brightness and a set value is fixed for the night which corresponds to a lower degree of brightness, in order to thus obtain an indication of where it has been forgotten to turn out the light at night.

For determining the development of smoke, on the other hand, a light source of constant brightness is arranged in front of a photosensitive sensor and a single fixed set value is provided, so that an inadmissible reduction of the transparency of the air in the room in question is signaled, when the measured value surpasses or falls below said set value.

In the known arrangement the control circuit of each measuring point substantially comprises two monoflops, the first of which is in each case triggered by the output impulse of the second monoflop of the preceding measured point after which it emits an output pulse with a predetermined time length which closes the switch arrangement for the period it appears at the control input of this switch arrangement connecting the sensor of this measuring point to a wire conducting the current to be impressed and which triggers the second monoflop of the respective measuring point by means of its trailing edge. The second monoflop produces by means of a short closing of a second switch a feedback to the control and measuring centre indicative of the end of the measuring procedure, and it then triggers the first monoflop of the next measuring point.

The monoflops of all measuring points of the known measuring arrangement are therefore closed together to form a long single chain. The control and measuring centre can only trigger the first monoflop of the first measuring point, after which this trigger pulse spreads like a wildfire through the monoflop chain without the centre having any further possibility to intervene.

In practical operation, a whole series of problems can result from this step-by-step switching from one measuring point to the next without the control of the control and measuring centre. If, by way of example, at a certain measuring point a measured value stepping out of line is to be checked, the complete monoflop chain has to be clocked through again in order to obtain a further value from this one measuring point.

A further problem resulting from the fact that the control and measuring centre cannot intervene, is seen in that it is extremely difficult to branch off the known measuring system. The second monoflop of the measuring point preceding such a branching would trigger the first monoflops of the next measuring points following in each branch almost at the same time so that several measured values would have to be fed back simultaneously to the centre. In the case of a single Y-shaped branch the difficulties arising can be solved, but they can no longer be solved in the case of a system which is branched to any desired extent and at any number of points.

Finally, the fact that the control and measuring centre cannot intervene during the course of the measurements at the individual measuring points, is particularly disadvantageous if, as is preferably the case, the switch arrangements of the measuring points are formed by contactless semiconductor switches, e.g. field effect transistors. As is known per se, such "analog switches" can be switched to and fro between an almost unlimitedly high resistance value appearing between their source-drain connections ("switch open") and a resistance value near zero ("switch closed"), by feeding a suitable pulse-shaped control signal to their control inputs. During the rising and falling times of the control signal pulse, a continuous transition occurs, however, between the two marginal resistance values so that measurement of the resistance of a sensor connected in series to such a switch is only appropriate in the steady state, i.e. when the switch is completely closed, but not during the rising or falling times of the control pulse edges.

Since the control pulses in the case of the known system are in each case produced by the first monoflop of the respective measuring point, it is very difficult to allow the control and measuring centre to operate such that measurements are always determined only in the steady state.

It is therefore the object of the invention to provide a measuring system of the type set forth at the outset, in which the control and measuring centre is better able to influence the measuring procedures running off one after the other at the measuring points.

SUMMARY OF THE INVENTION

This object is solved in accordance with the present invention by dividing the cable into sections each comprising a selectable circuit, each of which can be selected individually by the centre. A clock pulse signal transmitted to all the measuring stations is only active for the cable section which has selectively been activated. In this manner, the cable can be arranged as desired, the time required for the control centre to have access to certain measuring stations is shortened and semiconductor switches can be used because measurements are only made in the steady state. Moreover, the total leak current can be kept as low as desired.

Due to the fact that in accordance with the invention the complete measuring arrangement is divided into sections which can be selected individually by the centre, branched and meshed systems can be set up as desired by providing each cable section branching off from a junction or point of intersection with a selectable circuit which can always be triggered by the centre by the emission of the corresponding address, if the scanning of the measuring points of a cable section previously triggered has been ended or interrupted. The strictly linear arrangement is maintained within each cable section so that, for instance, in a certain section the n-th measuring point can only be scanned if all previous measuring points in this section have already been sensed. Nevertheless, the possibility of having access to a certain measuring point, e.g. for checking a measured value obtained a short time previously, is considerably enhanced since further clocking of the respective cable section is interrupted immediately after the measured value to be checked has been received, and this cable section can be clocked again from the start up to the measuring point in question. Since the clocking of the individual measuring points is carried out by the control and measuring centre, the period during which the switch arrangement of any measuring point is closed is exactly defined and known to the control and measuring centre, so that it can be very simply ensured that the determination of the measured values is always carried out only in the the steady state.

A particular advantage of the inventive arrangement is seen in the fact that monoflops need no longer be used in the individual measuring points. Since an inventive measuring arrangement can contain some 10,000 to 100,000 measuring points, particularly high demands must be made on the reliability of the component passing on the clock pulse of the measuring points. In the case of the known device these were the monoflops described hereinbefore which are available commercially as integrated, highly reliable components; however, they always need to be connected to an external RC network for producing a proper output pulse length. If one intends to use components which are not too expensive, it will be remembered that capacitors are components which are subject not only to wide manufacturing tolerances but also to quick aging. Therefore, reliability can be considerably enhanced by the omission of these monoflops, while at the same time the cost factor for the complete measuring arrangement is reduced.

Full details of the present invention together with a description of all its embodiments are set forth in the following disclosure and illustrated in the accompanying drawing.

BRIEF DESCRIPTION OF THE DRAWING

In the drawings:

FIG. 10 is a pulse diagram explaining the mode of operation of the circuit illustrated in FIG. 9.

DESCRIPTION OF THE INVENTION

Figure 1:
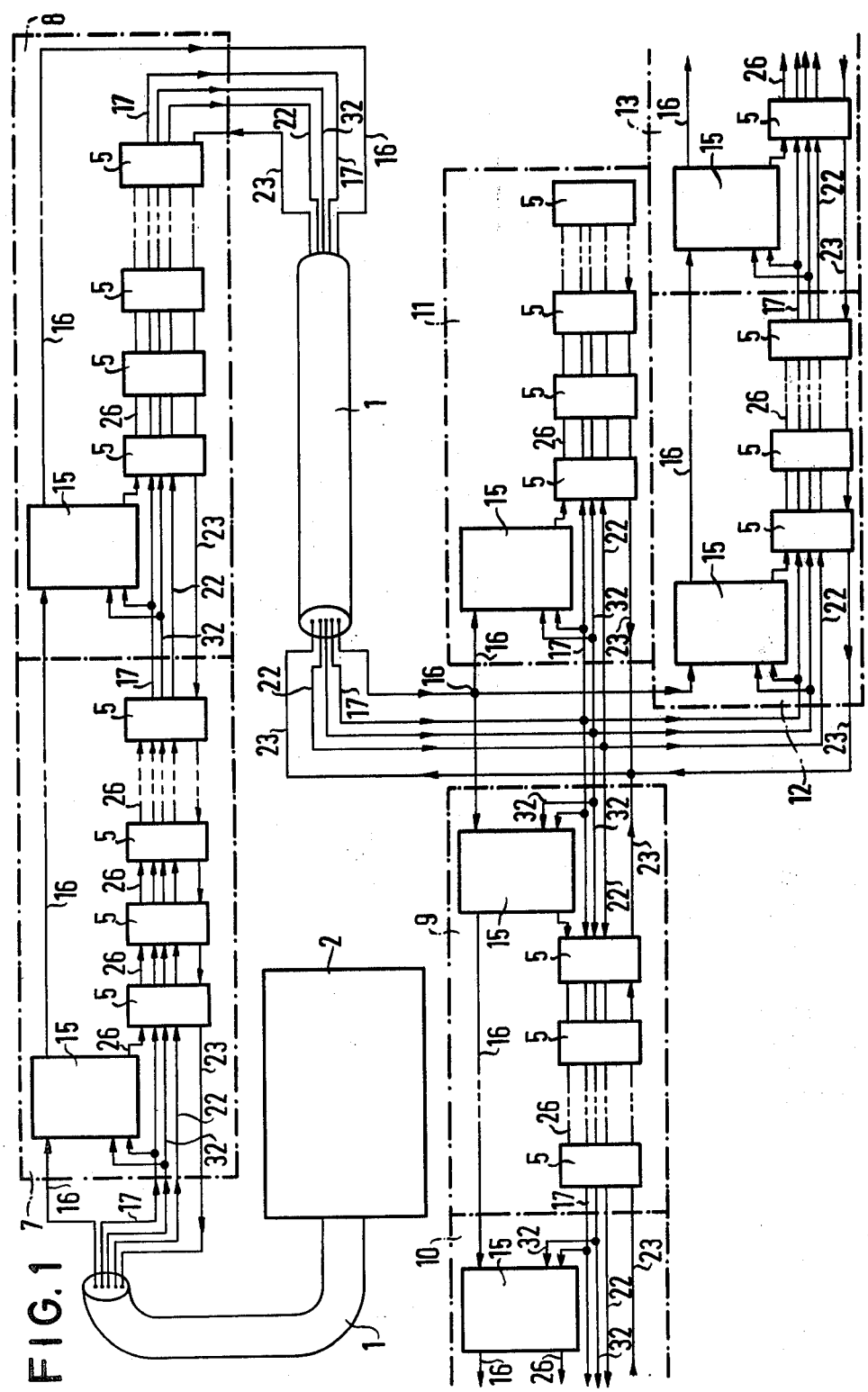
FIG. 1 is a circuit diagram of a measuring arrangement emboding the present invention.

Referring first to FIG. 1, a schematic overall view of an inventive measuring arrangement is shown in the case of which a multi-wire cable 1, which starts from a control and measuring centre 2, connects a plurality of measuring points 5 together.

The cable 1 is divided into a plurality of sections, only some of which are shown in FIG. 1, namely sections 7 to 13.

As will be seen in FIG. 1, these sections need not be arranged linearly in succession; due to the inventive embodiment of the complete measuring arrangement it is instead possible without difficulty to form branchings which may be either forked, cross-shaped or even star-shaped.

FIG. 1 shows a cross-shaped branching which is formed by the cable sections 8, 9, 11 and 12.

Further cable sections 10 and 13 are respectively connected to cable sections 9 and 12, whereas cable section 11 symbolizes a stub cable comprising only one single section. Advantageously, branching points of the cable 1 are always arranged such that they fall between the ends of cable sections, as is also shown in FIG. 1.

A selectable circuit 15 is provided in each cable section. This circuit can be activated by the control and measuring centre 2 by having the control and measuring centre 2 emit a certain code on a wire 16 of the cable 1 used as address wire, and this code is passed on to all selectable circuits 15 and compared with a stored address by means of a receiving and decoding unit provided in each of the circuits. The selectable circuit 15 whose address coincides with the address code instantaneously emitted by the control and measuring centre 2 then allows a clock signal from the control and measuring to be fed along a wire 17, acting as clock wire. The clock signal becomes become effective only for the measuring points assigned to it, i.e. which are situated in the cable section selected by circuit 15, whereas all other measuring points will not react to the clock signal at this time because their respective selectable circuits have not been activated beforehand.

Figure 2:
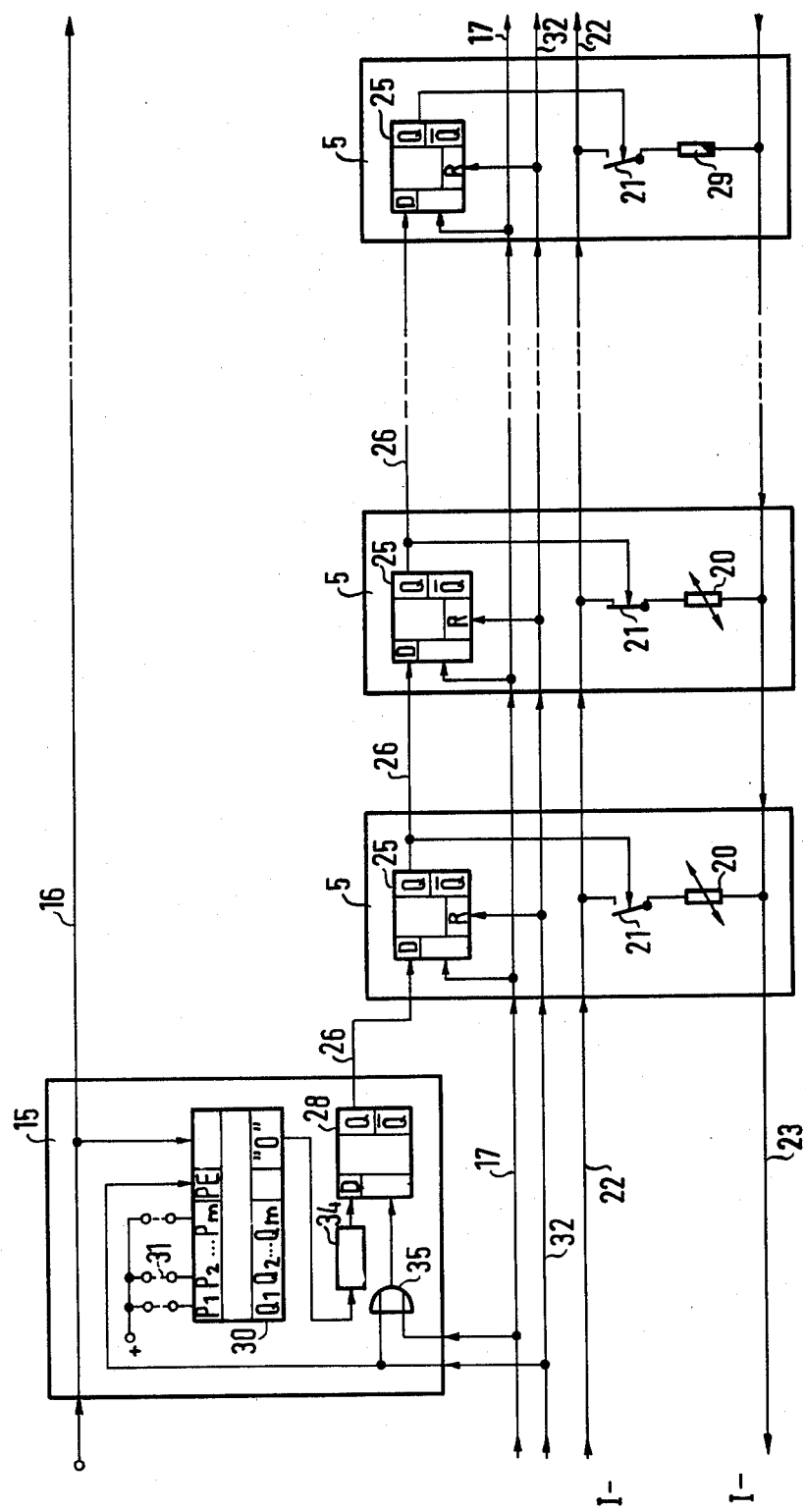
FIG. 2 is a circuit diagram of a cable section with details of the selectable circuit and the individual measuring points.

As will be particularly clearly seen in FIG. 2, each measuring point 5 comprises a sensor 20 which is in the example shown is a thermistor i.e. a component which changes its electric resistance value dependent on the ambient temperature. In the most general case, the sensor 20 can be formed by any component or circuit arrangement which changes its electric resistance dependent on some physical ambient parameter, e.g. humidity, brightness, pressure, etc. as well as temperature.

Each of these sensors 20 is connected via a switch arrangement 21, which is illustrated for the sake of simplicity in FIG. 2 as a mechanical breaker switch, to a wire 22 of the cable 1, in which wire 22 a constant current of a predetermined magnitude is impressed by the control and measuring centre.

Each of the sensors 20 are connected at their other ends to a further wire 23 of the cable 1 through which the current impressed through it when the switch 21 is closed, is fed back to the control and measuring centre.

The control of the switch arrangement 21 of each measuring point 5 is carried out by a control circuit provided in the measuring point which in the example shown is a D-flip-flop 25 whose Q-output is connected to the control input of the switch arrangement 21.

If a logical 1 appears at this Q-output, the switch 21 is kept closed, while it is open when a logical zero appears.

The D-flip-flops 25 of the measuring points 5 belonging to one cable section are connected with each other in the manner of a shift register in that the Q-output of the D-flip-flops of a measuring point 5 respectively situated further to the front in the cable section, i.e. near the selectable circuit 15, is connected by means of the corresponding portion of a wire 26 of the cable 1 to the D-input of the D-flip-flop 25 of the immediately succeeding measuring point 5, i.e. the measuring point situated further away from the selectable circuit 15.

The Q-output of the D-flip-flop 25 of the measuring point 5 situated farthest away from the selectable circuit 15, i.e. terminating the respective cable section, then controls only the switch 21 belonging to this measuring point, without being connected to the D-flip-flop 25 of a further measuring point.

The D-input of the D-flip-flop 25 of the first measuring point 5, i.e. the measuring point nearest the selectable circuit 15 of the respective cable section, is connected via a further section of the wire 26 to the Q-output of a D-flip-flop 28 provided in the selectable circuit 15, said D-flip-flop 28 thus forming the first stage of the shift register formed by the D-flip-flops 25.

This D-flip-flop 28 is triggered by the remaining circuit components of the selectable circuit 15, which will be described in greater detail hereinafter, in such a manner that after activating of the selectable circuit 15 by the address code emitted by the control and measuring centre 2, a logical 1 appears for a short period at its Q-output which is then shifted by the measuring point clock signal appearing at the measuring point clock wire 17 through the shift register formed by the D-flip-flops 25 of the measuring points. Hence the shift register is operated in the manner of a Johnson counter, i.e. a logical 1 always appears only at one of its Q-outputs while all other Q-outputs are at logical zero.

Thus, the switches 21 are closed and opened again, one after the other, so that the constant current impressed through the wire 22 can always flow through only one sensor 20. The voltage drop thereby produced, which, because of the resistance value of this sensor 20 proportional to the ambient parameter to be monitored, is a direct measure for the size of this ambient parameter, can be measured between the lines 22 and 23, in the control and measuring centre 2, and can be further processed while being clearly assigned to the measuring point 5 which is just being scanned at this instant.

If after the activation of a selectable circuit 15 the logical 1, which always closes only one of the switches 21 of the respective cable section, is shifted through to the last stage of the shift register formed by the D-flip-flops 25, the control and measuring centre 2 must receive information with respect to the fact that scanning has been terminated in the case of the respective cable section and that the address code for the selectable circuit 15 of another cable section must be produced and emitted. The information characterising the reaching of the end of a cable section may be obtained for example in that, in the case of the last measuring point 5, i.e. situated farthest away from the selectable circuit 15, the sensor 20 comprising a variable electric resistor is replaced by a fixed resistor 29 which is formed by a single component or a circuit and whose resistance value varies only very slightly even in the case of highly varying physical ambient parameters. In the example shown concerning a temperature measuring cable, this fixed resistor is a metal film resistor which, as is known per se, has an extremely low resistance/temperature coefficient. The value of the fixed resistance is selected such that it is clearly outside the resistance range in which the resistance values of the sensors 20 are to be found, when the physical ambient parameter to be monitored varies within the limits to be expected. In this manner, an unambiguous voltage value falling out of the range to be expected is produced upon closure of the corresponding switch 21 for the control and measuring centre 2 between the lines 22 and 23, and this voltage value can be detected by a comparator shown in FIG. 7. The output signal of this comparator 87 can then be used for causing the control and measuring centre 2 to switch further to another cable section.

The arrangement explained hereinbefore is advantageous, particularly if for some reason or other the cable sections have to be operated by one and the same control and measuring centre 2 which are of various length, i.e. which contain various numbers of measuring points. Then it is not necessary to store in the memory of the control and measuring centre 2, for each cable section, the number of measuring points contained therein and to recall this number each time the cable section has been selected.

If all cable sections are of equal length, the respective last measuring point may then be equipped merely with a sensor 20, because it is then sufficient to count in the control and measuring centre 2 the number of measuring point clock pulses produced and to select a new cable section after the maximum value has been achieved, which is the same for all cable sections.

The selectable circuit 15 illustrated in FIG. 2 in a simple manner contains, apart from the D-flip-flop 28, as most important component a programmable down counter 30 which serves as a receiving and decoding unit for the address code emitted by the control and measuring centre 2. This down counter 30 comprises programming inputs $P_1$ to $P_m$ which are connected by jumpers 31 either to a positive power source, i.e. receive a logical 1, or may be left at logical zero. These jumpers are closed or left open in a different manner for each selectable circuit 15 so that each of these down counters 30 is programmed to an individual numerical value which exists only once in the whole measuring arrangement.

In all cases where the down counters 30 receive a control pulse at their PE-inputs, which is fed to them in the present case by the control and measuring centre 2 through a wire 32 of the cable 1 serving as a reset line, the numerical value predetermined by the jumpers 31 is written into the down counters 30 and, starting with this value, they then start to count down when the control and measuring centre emits clock signals through the address line 16.

For selecting a certain selectable circuit 15, the control and measuring centre 2 thus always produces a certain number of clock pulses for the selectable circuits, and this results in the fact that only the down counter, at whose programming inputs a numerical value corresponding to the number of clock pulses for the selectable circuits is given, will reach the count zero exactly.

At the overflow output "0" of this one down counter 30 there then appears a logical 1 which is fed through a delay member 34 to the D-input of the D-flip-flop 28 of the selectable circuit 15.

A short time later, the control and measuring centre 2 produces a further reset pulse on the line 32, and this reset pulse, on the one hand again writes in the numerical value programmed via the jumpers 31 into the down counter 30, which had been previously selected by the control and measuring centre 2 and had counted down exactly to zero, and it thus makes the logical 1 disappear at the overflow output of this down counter 30. However, since this change in level is only effective somewhat later at the D-input of the D-flip-flop 28 because of the delay member 34, there is, on the other hand, enough time for this very reset pulse, which is fed to the clock input of the D-flip-flop 28 through an OR gate 35, to set this flip-flop, so that a logical 1 appears at its Q-output.

The first of the measuring point clock pulses appearing hereinafter on the line 17 also proceeds through the OR gate 35 to the clock input of the D-flip-flop 28 and again sets its Q-output to logical zero, but it is simultaneously fed to the clock input of the D-flip-flop 25 of the first measuring point 5 following the selectable circuit 15, and this flip-flop now takes over the logical 1 contained just previously in the D-flip-flop 28.

For all following measuring point clock pulses the D-input of the D-flip-flop 28 remains at logical zero, so that in actual fact only one single logical 1 is shifted further from measuring point to measuring point through the shift register formed by the D-flip-flops 28 and 25.

Figure 3:
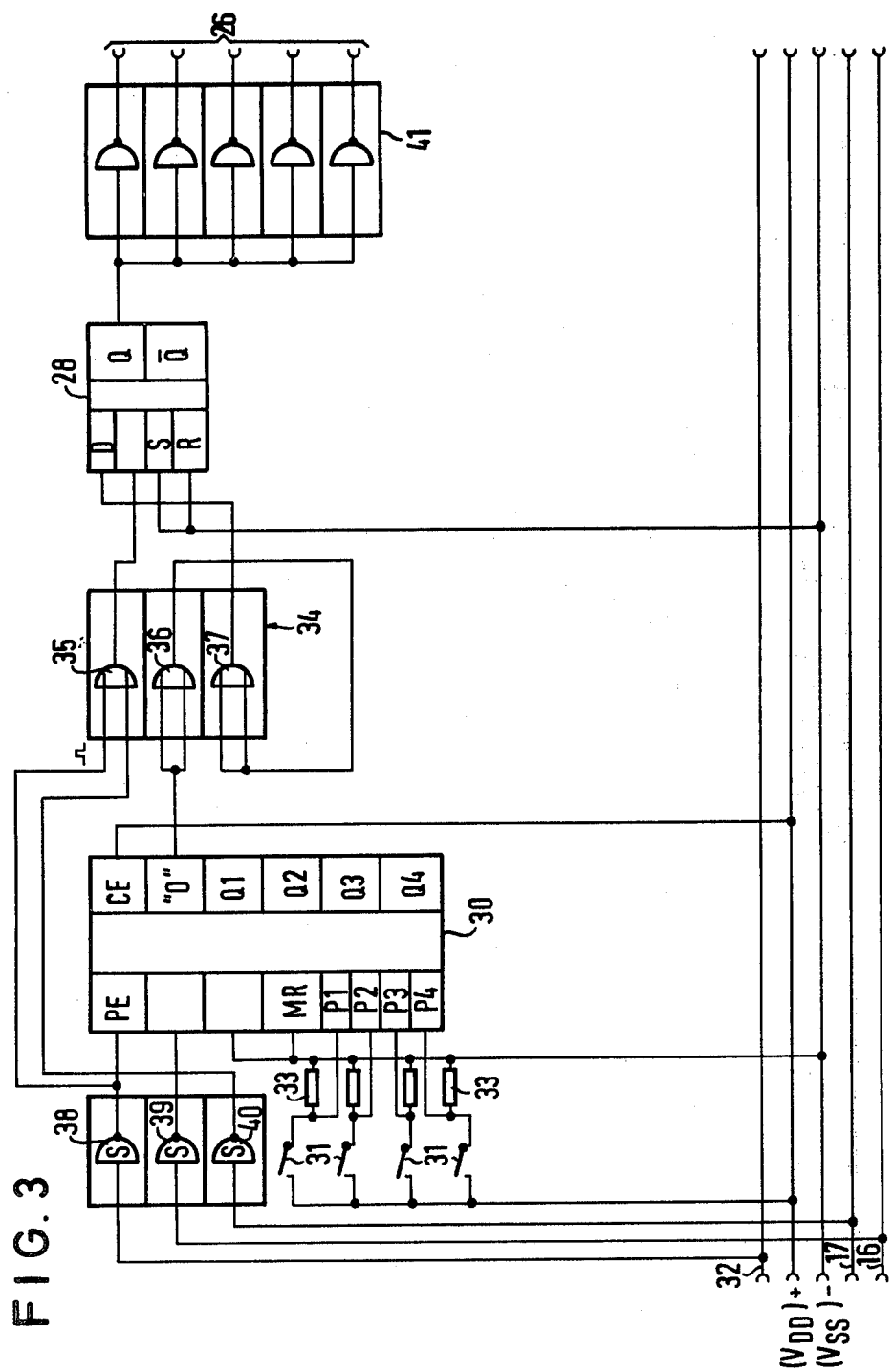
FIG. 3 is a circuit diagram of a preferred embodiment of a selectable circuit.

FIG. 3 shows a somewhat modified example of a selectable circuit 15, where the programmable down counter 30 comprises only four programming inputs, so that in this case the measuring arrangement can comprise fifteen selectable circuits 15. Since, however, each cable section connected downstream of a selectable circuit can comprise some 10,000 to 100,000 measuring points 5, very large wire networks can be operated with these few selectable circuits, given a distance of for instance one meter between the measuring points. Moreover, it is possible without difficulty to connect a plurality of the down counters 30 shown in FIG. 3 with one another and to thus achieve substantially large arrangements.

Each of the programming inputs P1 to P4 are connected through a resistor 33 to a negative supply voltage $V_{SS}$ so that they first of all are at a logical zero. Each of the programming inputs, however, may be connected through a programming device illustrated here as switch 31, to the positive supply voltage $V_{DD}$ so that they are drawn to logical 1.

The clock pulse input of the down counter 30 is in this case not directly connected to the address line 16 but is connected thereto through a Schmitt trigger 39 serving as pulse shaper and buffer. Since Schmitt triggers of this kind are commercially available as MOS components with inverting outputs, the clock pulses for the selectable circuits appearing on the address line 16 in the case of the embodiment example according to FIG. 3 must have the opposite polarity to that of the embodiment example in accordance with FIG. 2.

The same is true of the reset pulses which are fed from line 32, on the one hand through the Schmitt trigger inverter 38 to the PE-input of the down counter 30 and, on the other hand, through the OR gate 35 to the clock pulse input of the D-flip-flop 28. The clock pulses for the measuring points pass from line 17 through the Schmitt trigger inverter 40 to the second input of the OR gate 35.

The Q-outputs of the down counter 30 remain unused. Only the overflow output "0" is connected through a delay member 34, which is in this case formed by two OR gates 36 and 37, to the D-input of the D-flip-flop 28.

The most important difference between the embodiment example of a selectable circuit 15 illustrated here and the selectable circuit in accordance with FIG. 2 is seen in the fact that the Q-output of the D-flip-flop 28 triggers not only one but five parallel output lines 26, in each case through an inverter 41 serving as a buffer.

Figure 4:
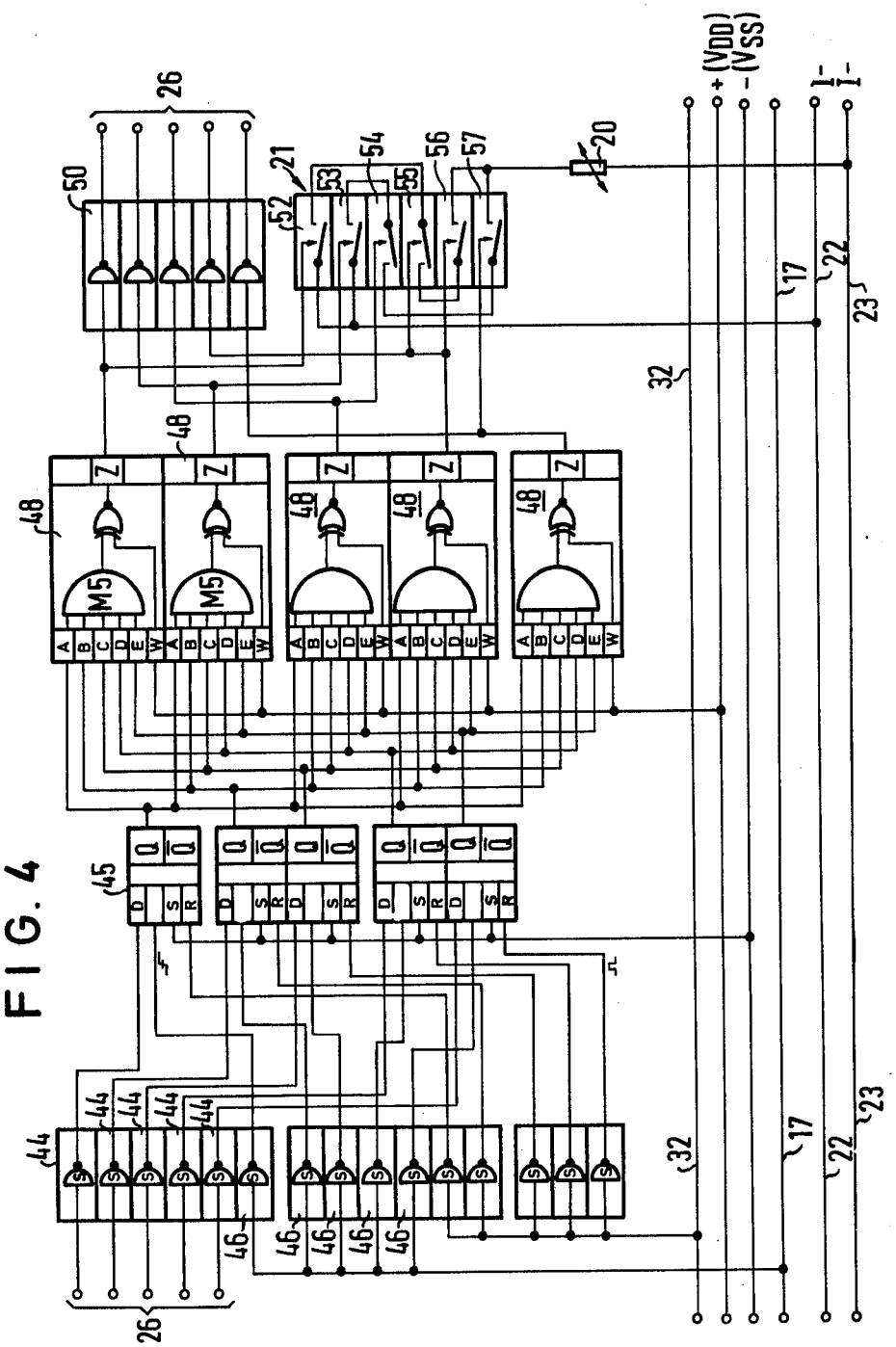
FIG. 4 is a circuit diagram of a preferred, particularly reliable embodiment example of a measuring point circuit, FIG. 5 schematic diagram of a hierarchic switch arrangement.

Five input lines 26 of an embodiment example of a measuring point 5 illustrated in FIG. 4 correspond to these five output lines of the selectable circuit 15 in accordance with FIG. 3. Each of these input lines 26 lead first of all to an inverting Schmitt trigger 44 for the purpose of pulse formation. The five outputs of these Schmitt triggers 44 lead respectively to the D-input of one of five D-flip-flops 45 which in this case have the same function as the D-flip-flop 25 in accordance with the embodiment example of FIG. 2. The D-flip-flops 45 are completely parallel to one another, i.e. their clock pulse inputs are also triggered commonly by the clock pulse line 17 for the measuring points through the Schmitt trigger inverters 46. The set inputs which are not required are connected commonly to the negative supply voltage $V_{SS}$.

The purpose of having these D-flip-flops 45 operating completely parallel to one another is to enhance the reliability of the circuit arrangement as compared with the embodiment example illustrated in FIG. 2. The Q-outputs of these D-flip-flops 45 do not trigger the switch arrangement 21 directly, but instead do so through five majority logic circuits 48, which in the present case make a three-out-of-five selection. That is to say that each of these logic circuits 48, which are available commercially as integrated MOS components, emit at their outputs exactly the same logic level which occurs at at least three of their five inputs. Thus it is achieved that the information emitted by the D-flip-flop 28 to the corresponding selectable circuit 15 is correctly shifted through the shift register stage in question, even if two of the five D-flip-flops 45 in parallel are defective. Since, as already mentioned, up to 100,000 measuring points are comprised in one cable section and may be assigned to one single selectable circuit 15, such a redundant layout is of great importance for ensuring reliable operation over long periods.

The outputs of the majority logic circuits 48 are, on the one hand, passed through inverters 50 serving as buffers to the outputs of the measuring point, from where they are connected through the next section of the lines 26 to the corresponding inputs of the next measuring point.

On the other hand, the outputs of the majority logic circuits 48 control the switch arrangement 21, here comprising six individual switches 52 to 57. The switches 52 to 57 are connected up in two parallel groups, each comprising three switches connected in series 52, 55, 56 and 53, 54, 57 respectively, between the line 22 carrying the impressed current from the control and measuring centre 2 and the sensor 20 embodied in this case as a thermistor. The switches 52 to 54 and 57 are each controlled by a separate majority logic circuit 48, whereas the control inputs of the two switches 55 and 56 connected up in series in one of the groups, are commonly connected to the output of one majority logic circuit 48.

This preferred arrangement provides for enhanced reliability, particularly if contactless semiconductor components, e.g. field effect transistor arrangements, are used as switches 52 to 57, since the connection in parallel of two switch groups permits the closing of the switch arrangement 21 even if one of the switches can no longer be closed, and since the connection in series of a multiple of switches in each group permits the opening of the switch arrangement 21, even if this should be no longer possible in the case of one or more of the individual switches 52 to 57.

In the case of the aforesaid use of contactless semiconductor or solid-state switches, a problem may arise even if each switch arrangement 21 comprises only a single switch, in as far as this "switch" in the "open" state does not possess an unlimitedly large resistance value. When the switch is open, the residual current flow is extremely low; however, since in the case of an inventive measuring arrangement all switches are parallel to one another between the two lines 22 and 23, it is possible in the most unfavourable case that when a system comprises up to several 100,000 measuring points, a total residual current results which is in the magnitude of some 100 microamperes to some milliamperes, without one single switch being closed. Since in accordance with the invention, a measuring current of for example 200 microamperes is impressed by the control and measuring centre 2 into the line 22, such a residual current would render all reasonable measurement impossible.

Figure 5:
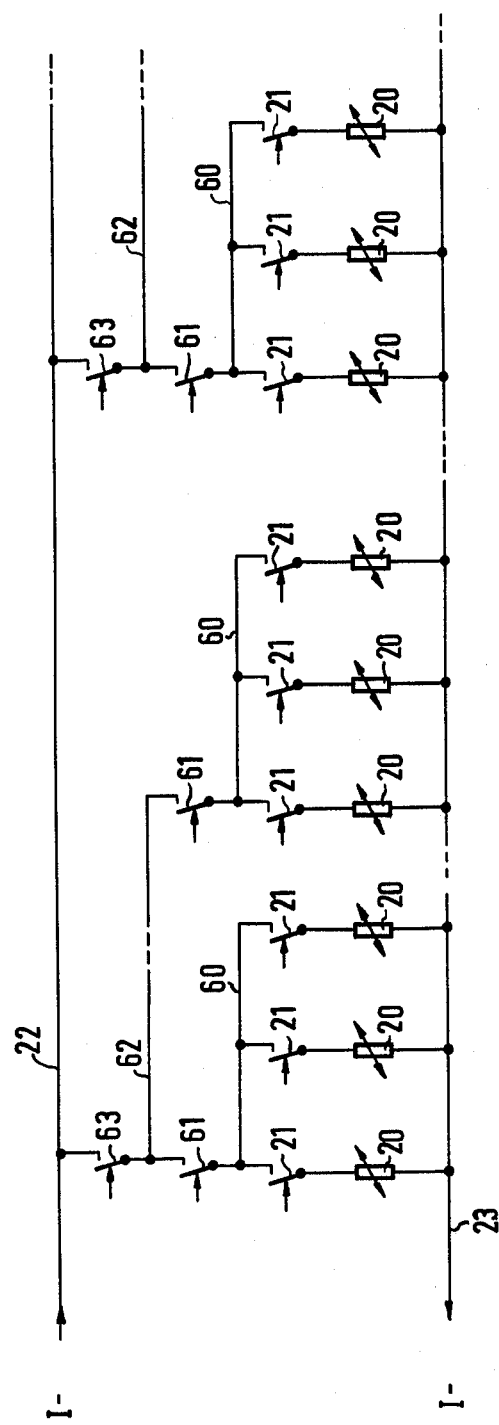

Therefore, in a particularly preferred embodiment example of an inventive measuring arrangement, the measuring point switch arrangements 21 are, as illustrated schematically in FIG. 5, not connected individually to the line 22 conducting the current to be impressed, but are connected in groups to the sections 60 of a further wire provided in the cable 1 which are not connected to one another. In FIG. 5 each of these groups comprise only three switch arrangements 21, but in practical use it is possible without any problem to connect fifty or more switch groups 21 to a single wire section 60.

A further contactless semiconductor switch arrangement 61 is assigned to each wire section 60, and this section 60 may, in the case of smaller measuring arrangements, be directly connected through this switch arrangement 61 to the wire 22, conducting the current to be impressed.

In the case of larger systems the switch arrangements 61 may, however, as illustrated in FIG. 5, be again combined in groups in that they are connected to the sections 62 of a further wire of the cable 1 which are again not in contact with each other, in which case a semiconductor switch arrangement 63 is assigned to each of these sections which provides connection to the wire 22.

This arrangement provides in the case of open switches that only the residual currents of the switch arrangement 63 in parallel will flow out of the constant current source of the control and measuring centre 2, and the number of these switch arrangements 63 is so drastically reduced with respect to the total number of switch arrangements 21 that the total residual current remains low in comparison to the measuring current.

For extremely large measuring arrangements the aforesaid hierarchic switch arrangement in accordance with the invention can be extended by one or more stages.

It will be noted that in the arrangement shown in FIG. 5, in which the control circuits for the switch arrangements 21 of the measuring points are omitted for the sake of clarity, provision must also be made for the controlling of the switch arrangements 61 and 63 since these switches must be closed so that the measuring current can flow through the sensors 20 belonging to the respective group or sub-group, as the case may be.

Figure 6:
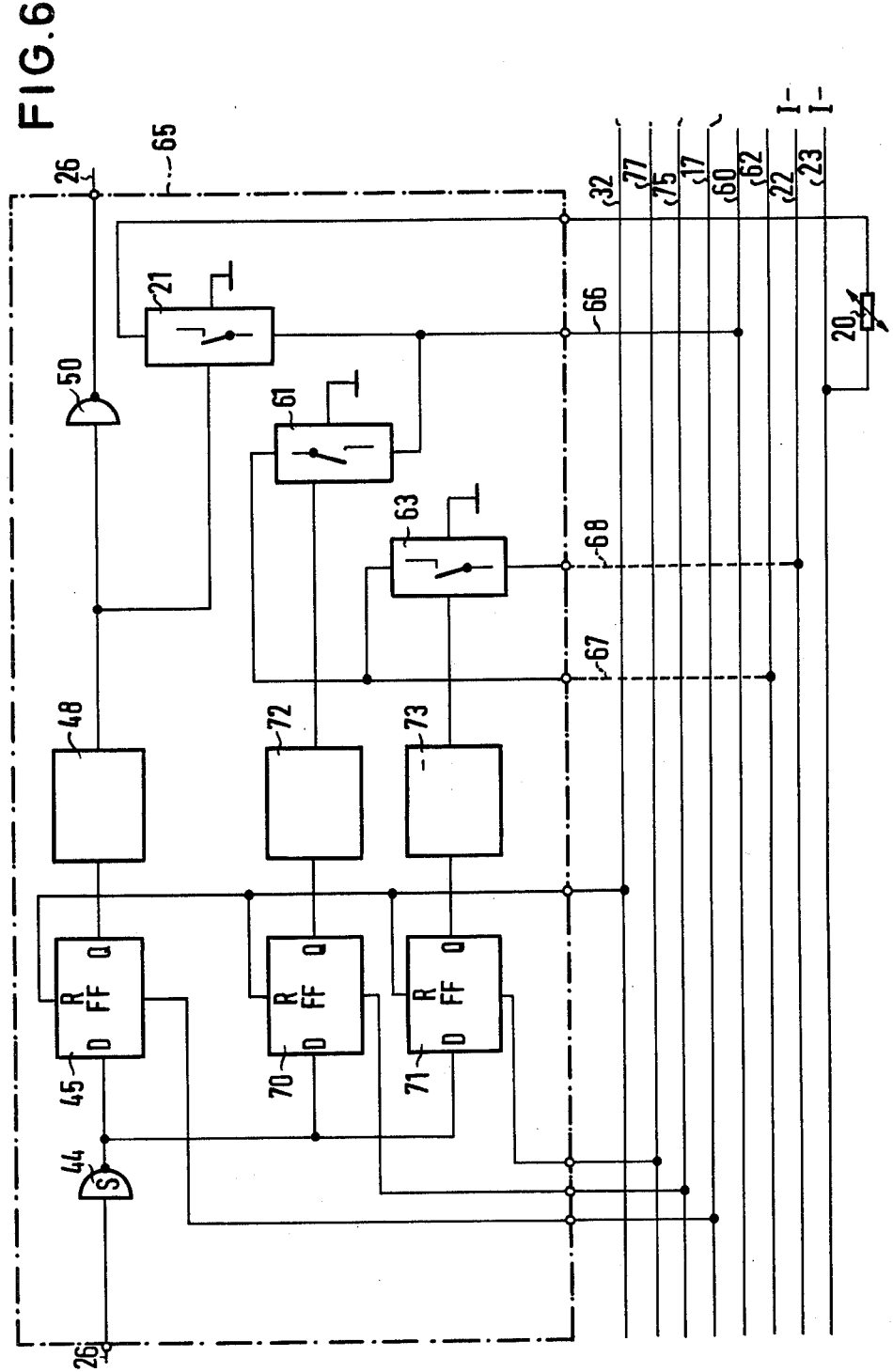
FIG. 6 is a circuit diagram of the control circuits comprised in one measuring point for hierarchically arranged switches.

A preferred method of carrying out this controlling of the switch groups 61 and 63 is shown schematically in FIG. 6. In accordance with a particularly preferred embodiment of the inventive measuring arrangement it is assumed that the electronic control system is for each measuring point 5 is an integrated circuit, the dimensions of which are indicated by the dot-dash line 65. It is then possible in principle for each measuring point to comprise not only the switch arrangement 21, which is necessary in any case, along with the corresponding electronic control system, but also the switch arrangements 61 and 63 with the corresponding control circuits. The number of components situated on such a measuring point chip is thus increased but this is only of minor importance as regards manufacturing costs when production numbers are appropriately large.

The combination of for example fifty measuring points 5 to form one sub-group, as illustrated in FIG. 5, is then carried out in that for forty-nine of these measuring points only the respective switch arrangement 21 is connected directly to the line section 60, as is illustrated in FIG. 6, while in the case of the fiftieth measuring point, the connection 67, which is indicated in FIG. 6 only by means of a broken line, is made between the switch arrangement 61 and the line section 62 in addition to this connection 66.

Fifty of the sub-groups thus formed may then be combined to form one group in that in the case of the two-thousand-five-hundreth measuring point, the connection 68 is closed between the switch arrangement 63 and the line 22 conducting the current to be impressed in addition to the connections 66 and 67.

In FIG. 6, the electronic control system of the switch arrangements 21, 61, and 63 is greatly simplified for the sake of more clarity. The Schmitt trigger 44, flip-flop 45, majority logic circuits 48 and output buffer 50, which are illustrated by means of simple component symbols, respectively correspond to the circuit arrangement in FIG. 4 bearing the same reference numbers, thus comprising in each case five identical components.

The same is also true of the flip-flop arrangements 70 and 71 which are new in this case and which in conjunction with the downstream majority logic arrangements 72 and 73 control the switch arrangements 61 and 63 which, for example, may be identical to the switch arrangement 21 illustrated in FIG. 4 as regards their construction.

The flip-flop arrangements 70 and 71 of each measuring point are prepared for setting their Q outputs to a logical 1 in the same manner as the flip-flop arrangement 45 and via the logic level coming through the lines 26, always when a corresponding date is passed on through the shift register formed by the flip-flop arrangements 45 after the activation of the selectable circuit 15 belonging to the respective cable section. The periods of time, during which a logical 1 appears at the Q outputs of the flip-flop arrangements 45, the flip-flop arrangements 70 and the flip-flop arrangements 71, are, however, different from one another since each of these flip-flop arrangements are set to the logic level appearing at their D inputs by a clock pulse of their own, i.e. the flip-flop arrangement 45 by the measuring point clock pulse appearing on the line 17, the flip-flop arrangement 70 by the sub-group clock pulse appearing on the line 75, and the flip-flop arrangement 71 by the group clock pulse appearing on the line 77.

Since it is assumed in the aforesaid embodiment that the subdivision of the plurality of measuring points into sub-groups and groups is always carried out only within one cable section, all these flip-flop arrangements 45, 70 and 71 can be set back commonly by means of the reset pulses appearing on the line 32.

The group and sub-group clock signals may also be produced by the control and measuring centre 2 and passed through leads 75 and 77 to all measuring points. An effect in the sense that the corresponding flip-flop arrangements 70 and 71, respectively, are set to a logical 1 at their Q outputs, only results, however, in the case of the measuring points whose selectable circuit 15 has just been activated, and which receive a logical 1 through the line 26 synchronously with the respective group or sub-group clock signal. If it is assumed that fifty measuring points are combined to form each subgroup and fifty subgroups are combined to form each group, then in the case of each first, fifty-first, one-hundred-first, etc. measuring point clock signal, a subgroup clock signal must be produced and, in the case of each first, two-thousand-five-hundred-and-first, five-thousand-and-first, etc. measuring point clock signal, a group clock signal must be produced.

Figure 7:
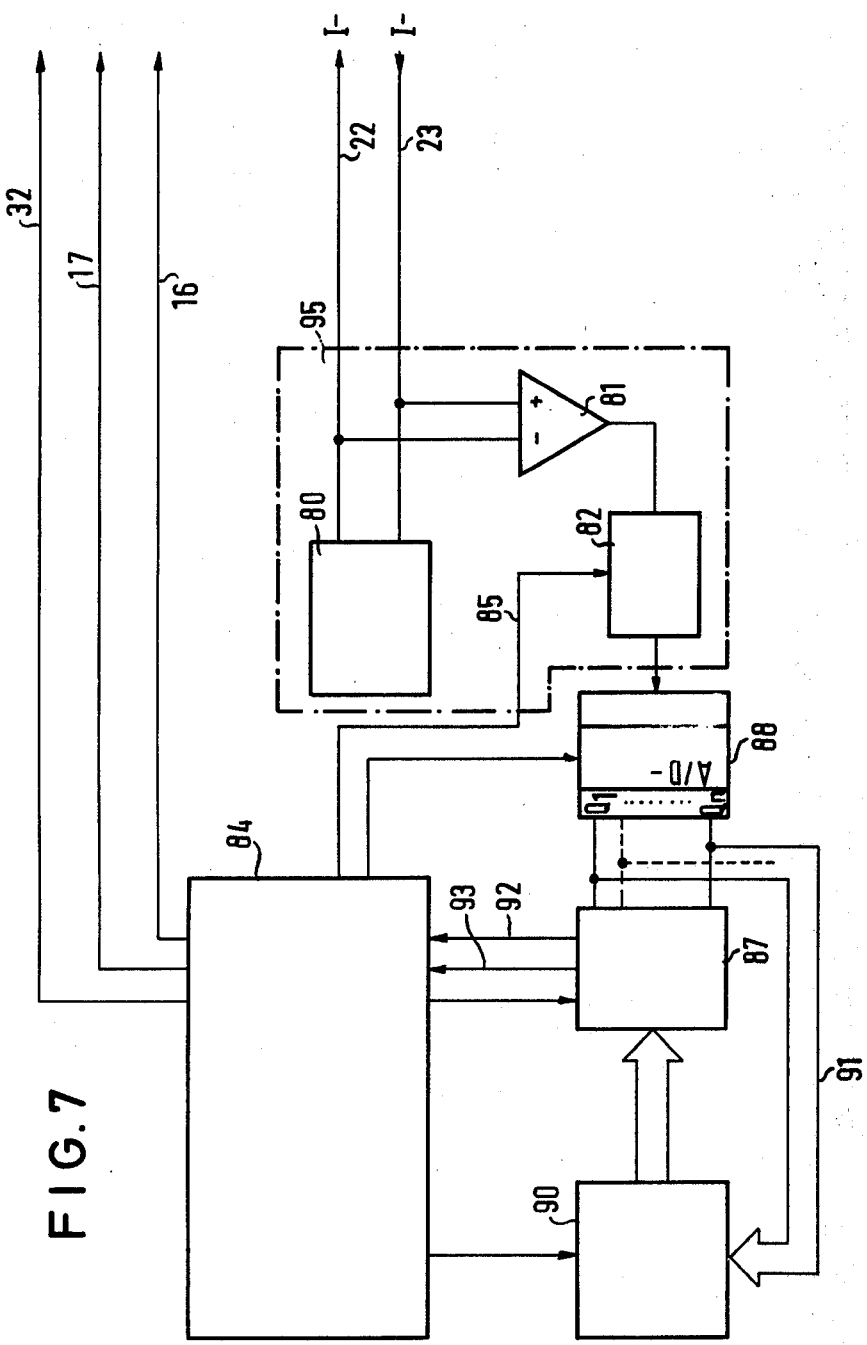
FIG. 7 is a schematic block diagram of the inventive measuring and control centre.

The control and measuring centre 2 of the arrangement comprises in principle the same components as those in the central unit described in the German Patent application No. P2800185.6. Thus, as illustrated in FIG. 7, a stabilized constant current source 80 is provided which impresses the measuring current through the line I-OUT and through the subsequent wire 22 of the cable 1 into the sensor 20 of the measuring unit 5 whose switch arrangement 21 is closed at this instant. This measuring current then flows through the wire 23 of the cable 1 via the connection I-BACK to the constant current source 80, so that the voltage drop occurring at the respective sensor 20, which is a measure for the respective ambient parameter to be monitored, e.g. representing the temperature of the area surrounding the sensor 20, can be measured and evaluated. For this purpose, this voltage drop is first of all amplified by a differential amplifier 81 and then fed to an analog memory 82 which, for example, may be embodied as a sample and hold circuit and which is controlled by a control unit 84 through the line 85, such that it accepts and places in intermediate storage the voltage value emitted by the differential amplifier 81 only if a predetermined minimum period has elapsed since the closing of the switch arrangement 21 of the measuring point 5 which has just previously been scanned.

This is of great importance, especially if the switch arrangements 21 are constructed with the aid of analog switches comprising field effect transistors. These switches have the property that their resistance value does not change suddenly as in the case of a mechanical switch, but continuously, from the very high value corresponding to the open state to the very low value corresponding to the closed state, and vice versa, when the control signal closing or opening them does not exhibit unlimited steep pulse edges. During opening or closing, such a switch can thus pass through any resistance values, which has the result that at these times any voltage values can also occur at the output of the differential amplifier 81. Due to the fact that the analog memory 82 is triggered by the control unit 84 in such a manner that it receives the voltage value transmitted by the differential amplifier 81 only if the measuring point clock signal, which is also emitted from the control unit 84, has definitely completely closed the respective switch 21, the system operates only in the steady state and in actual fact only the voltage drop is measured which occurs at the respective sensor 20.

The voltage value thus obtained is then transmitted to a comparator 87, such transmission occurring either in the analog form or, as shown in FIG. 7, after digitisation has been carried out by means of an analog to digital converter 88.

The comparator 87 then compares under the control of the control unit 84, that digitised measuring values with set values which are transmitted to it by a set value memory 90.

These set values represent the value of the physical ambient parameter of the respective measuring point to be monitored, which is to be expected under normal circumstances.

By way of example, they can be obtained in that in predetermined time distances the measuring values of all measuring points are sensed, one after the other, and then transmitted as new set values through the multiple line 91 to the set value memory 90, if no unusually high measuring value differences result between directly adjacent measuring points. In this manner, the influence of a global temperature change caused for instance by a change of the degree of sunshine, such influence acting in the same manner on a plurality of sensors 20, can be detected as a "normal circumstance" and eliminated, for instance if the measuring points are equipped with thermistors for monitoring a district heating pipeline, whereas if the temperature gradient between some few measuring points and their adjacent measuring points varies drastically due to a leakage in the district heating pipeline, the difference thus caused between the measuring values obtained at these measuring points and the set values can be detected by the comparator 87 and indicated by the emission of a fault signal through the line 92 to the control unit 84 which then can trigger further checking or alarm operations.

In another application case, where, for example, the measuring arrangement is equipped with photosensitive resistors as sensors 20 for monitoring a building complex comprising several rooms, a uniformly fixed set value can be determined for all measuring points 5, and the measuring signal will then always clearly deviate from this set value if the light was left on in the respective room over night.

Moreover, the comparator 87 may be embodied such that it differs between the measuring value produced for instance by the metal film resistor 29 of a pseudo measuring point and characterising one end of the cable section and falling clearly out of line with the normal measuring range, and the remaining measuring values, and that it transmits appropriate information through the line 93 to the control unit 84.

Figure 8:
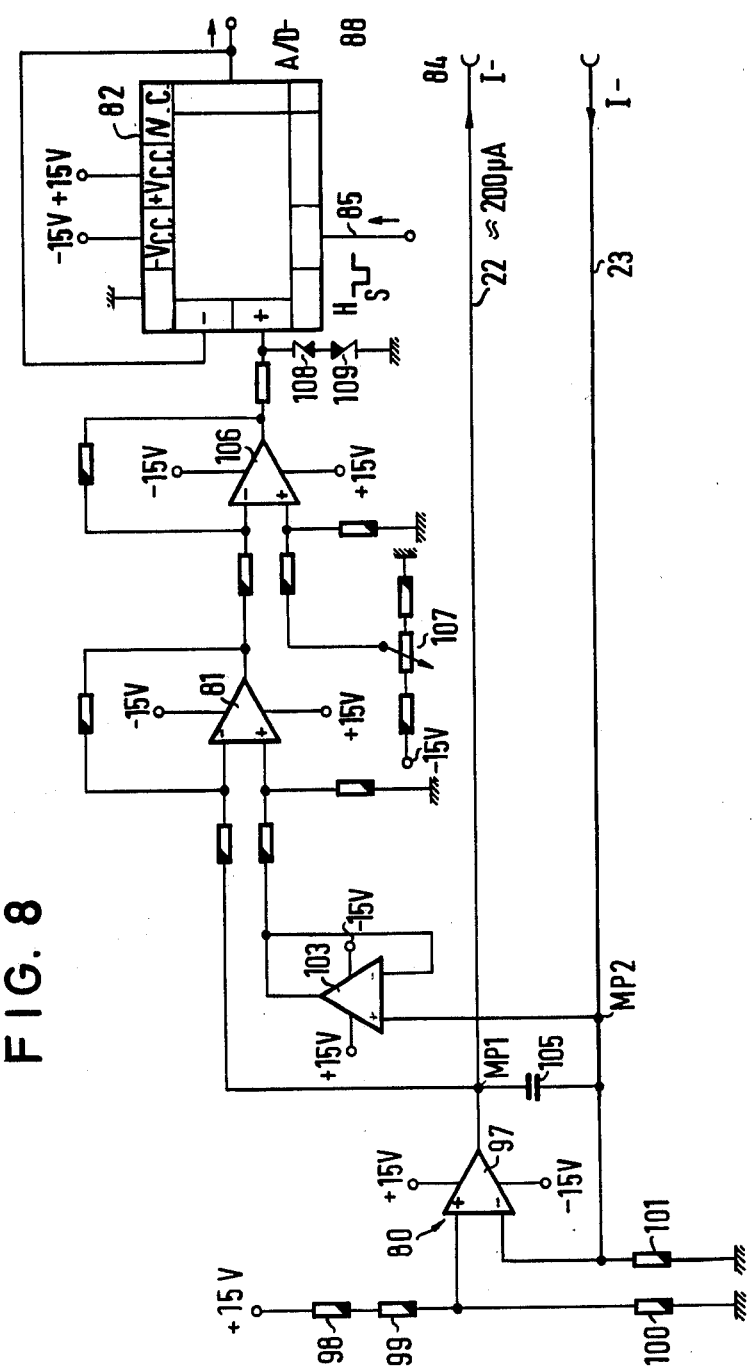
FIG. 8 is a diagram of the portion of the control and measuring centre for current impression and formation of measured values.

In FIG. 8, the portion of the control and measuring centre 2, which is enclosed in the dot-dash line 95 in FIG. 7, is shown in more detail and a particularly preferred embodiment example of the inventive measuring arrangement is correspondingly illustrated.

In accordance with FIG. 8 the constant current source 80 is formed by an operational amplifier 97 which receives at its plus input a fixed predetermined voltage by way of a voltage divider formed by metal film resistors 98, 99 and 100, and whose minus input is, on the one hand, connected to the wire 23 of the cable 1 transmitting back the measuring current and, on the other hand, to the earth of the system through a metal film resistor 101. The operational amplifier 97 now controls the current flowing from its output through the wire 22 to the respectively switched-on sensor 20 and the current flowing back through the wire 23 such that exactly the same voltage occurs at the resistor 101 as at the point of the voltage divider sensed by the positive input of the operational amplifier 97. Since the metal film resistors 98 to 101 show practically no drift occurrances whatsoever, a constant current is thus always emitted by the operational amplifier 97.

Depending on the instantaneous resistance value of the sensor connected between the wires 22 and 23, the voltage between the points MP1 and MP2 thus changes, which is therefore a measure for the physical ambient parameter to be measured.

This voltage has now to be transmitted to the differential amplifier 81 so that it can be further processed. This differential amplifier 81 is used in particular because it exhibits very good common-mode or in-phase signal rejection. This is necessary because considerable interference voltages can still be coupled in a capacitive or inductive manner into the wires 22 and 23, even if the cable 1 connecting the control and measuring centre 2 to the selectable circuits 15 and measuring points 5 is well shielded. However, since these interference voltages occur with the same amplitude and same phase relationship on the wires 22 and 23 and thus at the measuring points MP1 and MP2, they are completely rejected by the differential amplifier 81.

This is, however, only possible if it operates absolutely correctly, i.e. perceives roughly the same input resistances at both of its inputs. Now the output resistance of the operational amplifier 97 is very small as compared with the resistance value of the metal layer resistor 101. Without the application of further measures, this would lead to strong asymmetries at the input of the differential amplifier 81 and would worsen its common-mode signal rejection. Therefore the invention provides that the potential from the measuring point MP2 is not transmitted directly to the differential amplifier 81 but through an operational amplifier 103 which is connected up as an impedance converter or voltage follower and which has the amplification 1 and serves to reduce the high resistance value of the metal layer resistor 101 to a lower value corresponding to the output resistance of the operational amplifier 97. Hence the differential amplifier 81 is operated completely symmetrically and with very good common-mode signal rejection.

Very high frequency interference voltages between the measuring points MP1 and MP2 are short circuited by the capacitor 105.

In accordance with FIG. 8, a further operational amplifier 106 is connected downstream of the differential amplifier 81, which can in principle also be omitted but which is used here advantageously for signal adaptation. A predetermined, fixed potential value is transmitted through a voltage divider 107 to its positive input, so that at its output only the difference between this potential value and the respective measuring potential appears.

This serves for measuring range adaptation since the voltage changes ΔU to be measured always amount to only a relatively small percentage of the total voltage being dropped at the sensors 20 and since the basis value is of no interest.

The output signal of the operational amplifier 106 is then transmitted to the input of a sample and hold circuit 82 serving as an analog memory which is protected against excess voltages by two Zener diodes 108 and 109 which are connected in series opposite each other and which are grounded.

As already described, this sample and hold circuit 82 is controlled via the lead 85 by the control unit 84 such that it will only receive the voltage value emitted by the operational amplifier 106 if the switch unit 21, which is being scanned, is in the steady state, i.e. is definitely closed and has a constant, extremely small resistance value.

Figure 9:
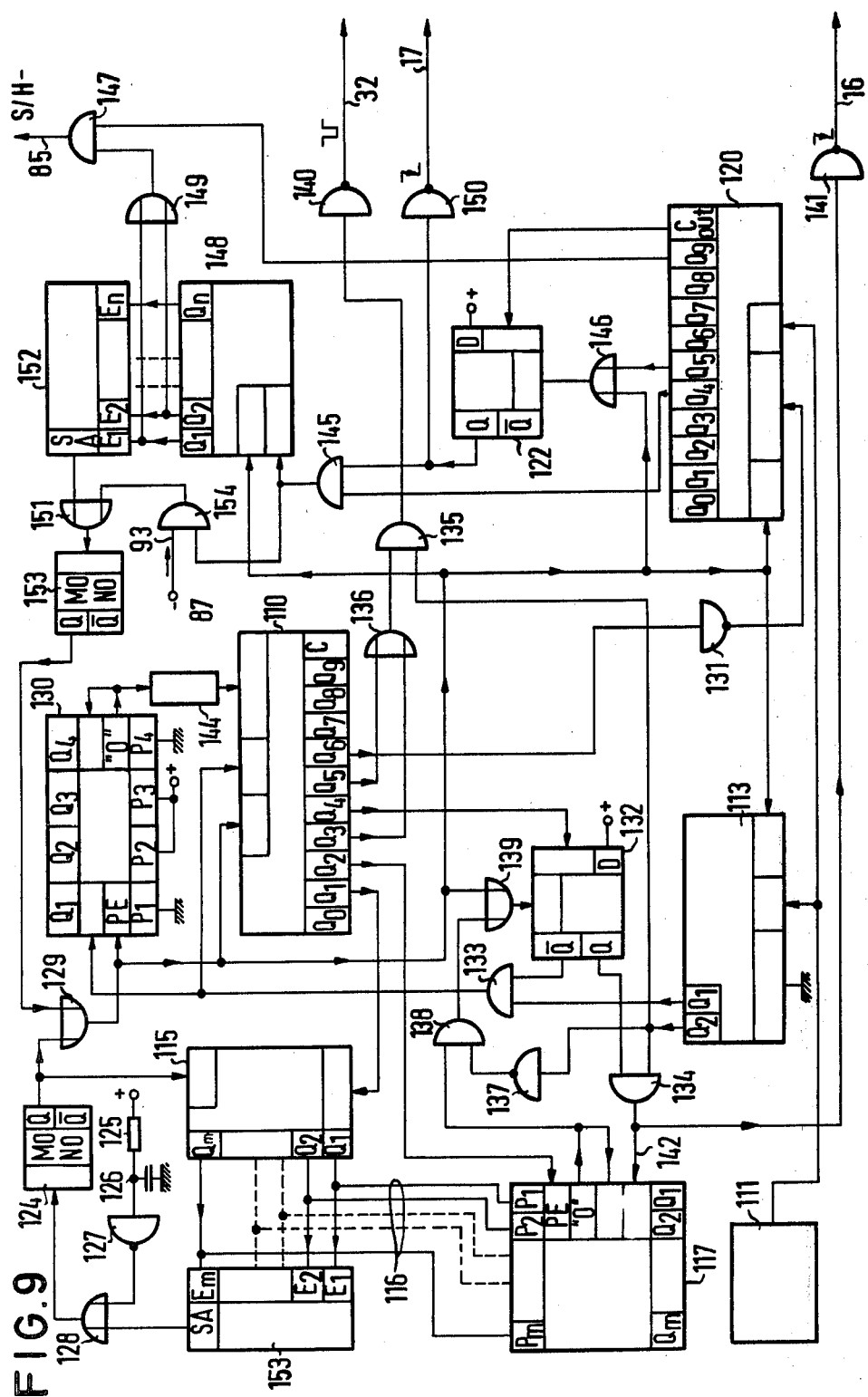
FIG. 9 is a diagram of the portion of the control and measuring centre for producing the digital control signals for the selectable circuits and measuring points.

FIG. 9 shows a particularly preferred embodiment of the portion of the control and measuring centre 2 which is responsible for producing the selectable circuit clock signals, the measuring point clock signals and the reset signals, i.e. which provides the wires 16, 17 and 32 of the cable 1 with signals. Moreover, this circuit is connected to the comparator 87 (FIG. 7) via the line 93, and it receives the signals indicative of the fact that it has arrived at a pseudo measuring point. A further connection runs through the line 85 to the sample and hold circuit 82 (FIGS. 7 and 8), through which the latter is caused to receive the measuring value transmitted by the operational amplifier 106 at the appropriate times.

The central component of the circuit arrangement illustrated in FIG. 9 is an operation control 110 which is embodied as a Johnson counter and which, for running through all operation procedures, which are necessary for selecting a cable section, for scanning the measuring points present in this cable section and for receiving the respective measuring values in the further processing circuit, defines time intervals $T_0$ to $T_6$ which, altogether, are referred to hereinafter as a cable section cycle.

A further Johnson counter 113, which is in this case, however, only a two stage counter, serves to produce the operation clock signal, which it emits at its output $Q_1$ and which is illustrated in the second line from the top in FIG. 10, from the master clock signal which is emitted by a master clock 111 and which is illustrated in the top line in FIG. 10.

Further, an address counter 115 is provided whose count is increased by one counting step at the end of each cable section cycle. At the outputs $Q_1$ to $Q_M$ of this address counter a new selectable circuit address is provided in this manner, which is passed through the line 116 to a programmable down counter 117 and which ensures that via the lead 16, in a period determined by the operation control 110, a series of pulses are emitted as selectable circuit clock pulses, the number of which corresponds to the number predetermined by the address counter 115.

A third Johnson counter 120 serves for producing measuring clock pulses from which, on the one hand, the measuring point clock pulses to be emitted on the line 17 by a flip-flop 122 are derived, and from which, on the other hand, the triggering signal for the sample and hold circuit 82 is derived which is to be produced in addition to this measuring point clock pulses in the correct position as to time.

In the case of the following functional description of the circuit illustrated in FIG. 9 it is assumed that the Johnson counters, flip-flops, countup and countdown counters contained therein would indicate completely arbitrarily logical 1 or 0 levels at their outputs after switching on the current supply and without any further measures being taken. Therefore a start mono-flop 124 is provided which is triggered shortly after switching on the current supply by a capacitor 126, which is charged through a resistor 125, via an inverter 127 and an OR gate 128, in such a manner that it emits a reset pulse at its Q output which is transmitted directly to the address counter 115 and through an OR gate to all remaining counters and flip-flops. By means of this reset pulse the operation control 110 is brought into a state in which it indicates a logical 1 only at its output $Q_0$, while a logical 0 appears at all other outputs. Thus the arrangement is situated in the time interval $T_0$ (see fourth line from above in FIG. 10).

Furthermore, the reset pulse emitted by the OR gate 129 goes to the the PE input of a programmable countdown counter 130 which serves to count the operation clock pulses transmitted to the operation control 110 and to block the operation control 110 through its clock enable input by means of a signal appearing at its overflow output "0", if six clock pulses have been transmitted to the latter. Thus, the programming inputs $P_1$ to $P_4$ of this operation clock pulse counter 113 are connected to ground or to the positive supply voltage in such a manner that the count value six is inputted into it by the reset pulse acting on its PE input.

The output pulses of the master clock 111, which is started when switched on, are transmitted to the clock inputs both of the Johnson counter 113 serving for producing the operation clock pulses and to the Johnson counter 120 serving for producing the measuring clock pulses. The latter is, however, blocked by a logical 1 at its clock enable input, and this logical 1 is fed to the counter 120 through an inverter 131 from the output $Q_6$, which is at logical 0, of the operation control 110.

Thus, only the Johnson counter 113 reacts at first to the master clock signals, and it emits a first pulse at its output $Q_1$ which passes through the AND gate 133, which is opened by the $\overline{Q}$ output of a reset interruption flip-flop 132, to the clock inputs both of the operation clock pulse counter 130 and the operation control 110. In this manner, the output $Q_1$ of the operation control 110 is set logical 1, while a logical 0 appears again at the output $Q_0$.

Thus the complete arrangement is situated in the time interval $T_1$ which serves to increase the contents of the address counter 115 by one, and this is carried out by the rising signal edge from the output $Q_1$ of the operation control 110, which signal edge acts on the clock input of this address counter.

The pulse appearing in the time interval $T_1$ at the output $Q_2$ of the Johnson counter 113 (see FIG. 10, third line from above) remains ineffective since the AND gate 134 is blocked by the Q output of the interruption flip-flop 132, which is at logical 0, while the AND gate 135 is stopped from passing on this pulse by the OR gate 136, since this OR gate 136 receives at its two inputs the zero level of the outputs $Q_3$ and $Q_5$, respectively, of the operation control 110.

The pulse appearing in the time interval $T_1$ at the output $Q_2$ of the Johnson counter 113 can therefore at the most pass through the inverter 137 to the AND gate 138 which can be blocked or conductible after the complete arrangement is switched on, since the selectable circuit clock counter 117, which controls the second input of this AND gate, does not receive a reset pulse and therefore can exhibit at its overflow output either a logical 0 or a logical 1. However, in the last case, too, the pulse coming from the $Q_2$ output of the Johnson counter 113 remains ineffective since after passing the AND gate 138, it can at the most pass through the OR gate 139 to reach the reset input of the interruption flip-flop 132 which is set back anyway.

The next pulse of the master clock 111 again passes through the $Q_1$ output of the Johnson counter 113 and the AND gate 133 to the clock inputs of the operation clock pulse counter 130 and of the operation control 110. The contents of the former is again reduced by one and the operation control 110 shifts the logical 1 from its $Q_1$ output onto its $Q_2$ output. Thus, the PE input of the selectable circuit clock pulse counter 117 receives a signal which causes it to read in the count emitted by the address counter 115 through the lines 116. Thus the address of the first selectable circuit 15 is contained in this countdown counter 117. A logical 1, which may be present at its overflow output, disappears so that the pulse appearing during this time interval $T_2$ at the $Q_2$ output of the Johnson counter 113 also remains ineffective.

The next pulse at the $Q_1$ output of this Johnson counter 113 switches the arrangement further to the time interval $T_3$ which is defined in that a logical 1 appears at the $Q_3$ output of the operation control 110. This logical 1 is passed further through the OR gate 136 and the AND gate 135, as is illustrated in FIG. 10 in the sixth line from the top. Thus the pulse now appearing at the $Q_2$ output of the Johnson counter 113 can pass through the AND gate 135 (see FIG. 10, seventh line from above) and can be emitted as reset pulse through a buffer inverter 140 on the line 32.

By means of this reset pulse, any set measuring point flip-flops 25 or 45 are set back and the respective counts, which are predetermined by the programming device 31, are written into the counters 30 of all selectable circuits 15. In so doing, the D flip-flop 28 (see FIGS. 2 and 3) of each selectable circuit can be set at its Q output either to logical 1 or logical 0, depending on which logic level existed at the overflow output of the corresponding countdown counter 30 when this reset pulse occurred. This possible first setting of the D flip-flop 28 is, however, insignificant as regards further functional operation.

By means of the next clock pulse appearing at the $Q_1$ output of the Johnson counter 113, the logical 1 of the operation control 113 is shifted further from the $Q_3$ output to the $Q_4$ output whereby the interruption flip-flop 132 is set (see FIG. 10, fifth line from above). Thus, the logical 1 disappears at the $\bar{Q}$ output of this flip-flop and the AND gate 133 is blocked for the time being, so that no further pulses can pass from the $Q_1$ output of the Johnson counter 113 to the operation control 110, which would clock the latter further. Instead, the AND gate 134 is opened in the time interval by the logical 1 appearing at the Q output of the interruption flip-flop 132, so that the pulses appearing at the $Q_2$ output of the Johnson counter 113 can reach the line 142 as is illustrated in FIG. 10 in the eighth line from above.

These pulses are also transmitted to the clock input of the selectable circuit clock pulse counter 117 which, proceeding from the count inputted into it by the address counter 115 at the time interval $T_1$, counts them down until it has reached the value zero after which it opens, via its overflow output, the AND gate 138 which thus allows the positive signal edge through, which was produced by the inverter 137 upon the dropping of the last pulse from the $Q_2$ output of the Johnson counter 113, and which resets the interruption flip-flop 132 through the OR gate 139 so that the AND gate 134 is again blocked. The AND gate 135 was blocked in any case during the whole interval $T_4$ by the logical zeros at the inputs of the OR gate 136 from the $Q_3$ or $Q_5$ output of the operation control 110, so that no pulse could reach the reset line 32.

As has just been described, the selectable circuit clock pulse counter 117 limits the number of pulses emitted by the AND gate 134 to the number prescribed to it by the address counter 115, and this number differs from one cable section cycle to the next. Thus, a number of selectable circuit clock pulses corresponding to exactly this number are transmitted from the line 142 through the buffer inverter 141 to the line 16 which passes them on to all selectable circuits 15.

It will be noted that the buffer 141, just like the buffer 140, must be an inverting one if the selectable circuits 15 correspond to the embodiment example illustrated in FIG. 3, whereas these two buffers are not chosen to be inverting for the embodiment example illustrated in FIG. 2.

In each case, the clock pulses emitted by the AND gate 134 through the line 142, the buffer 141 and the line 16 are transmitted to the clock inputs of the down counter 30 of each selectable circuit 15 and are also counted by these down counters 30. Since a different number was inputted into each of these selectable circuit down counters 30, only one of these down counters 30 will have reached the count 0 at the end of the time interval $T_4$, so that a logical 1 will appear at its overflow output.

Since, as already explained, the interruption flip-flop 132 is again reset at the end of the time interval $T_4$ (see FIG. 10, fifth line from above), a logical 1 again appears at the $\bar{Q}$ output of this flip-flop, so that the AND gate 133 again becomes conductive for the pulses appearing at the $Q_1$ output of the Johnson counter 113. Thus the next of these pulses shifts the logical 1 from the $Q_4$ output of the operation control 110 to the $Q_5$ output, from where it is transmitted through the OR gate 136 to the AND gate 135.

The pulse appearing at the $Q_2$ output of the Johnson counter 113 at the time interval $T_5$ can thus pass through the AND gate 135 to the buffer 140 and from the latter to the reset line 32.

This second reset pulse of the cable section cycle sets the countdown counters 30 of all selectable circuits 15 back to the count predetermined by the respective programming device 31, so that the down counter 30, which had been brought to the count zero by the aforesaid selectable circuit clock pulses again also loses the logical 1 at its overflow output. The disappearance of this logical 1 is, however, delayed by the delay circuit 34 so that the reset pulse, which simultaneously reached the clock input of the D flip-flop 28 through the OR gate 35, can set the Q output of this D flip-flop 28 in the desired manner to a logical 1. In the case of all other selectable circuits 15, the overflow output of the down counter 30 was at logical 0, anyway, so that the corresponding D flip-flops 28 will definitely be set to logical 0 at their Q outputs. Thus, it is only for the one cable section determined by the count of the address counter 115 that the first stage of the shift register formed by the D flip-flops 28 and 25 of this cable section is set to a logical 1 which, in the case of the subsequent measuring point clock signals, can be shifted further from measuring point to measuring point.

This is carried out during the subsequent time interval $T_6$ which is initiated by the next pulse appearing at the $Q_1$ output of the Johnson counter 113. This pulse also brings the operation clock pulse counter 130 to the count 0 so that a logical 1 appears at the overflow output of the latter, which is transmitted through a delay member 144 to the clock enable input of the operation control 110 and blocks the latter for the time being. The delay member 144 prevents blocking of the operation control 110 due to unfavourable signal transit time conditions, before the logical 1 has been shifted further from the output $Q_5$ to the output $Q_6$.

In the time interval $T_6$ now beginning, the output signal of the inverter 131 drops to logical 0, as is illustrated in the ninth line from the top in FIG. 10, so that now the Johnson counter 120 for producing the measuring pulse can react to the pulses emitted by the main clock 111. These pulses continue to be fed to the Johnson counter 113, so that at the outputs $Q_1$ and $Q_2$ of the latter, further pulses appear continuously but this, however, has no effect because the operation control 110 is blocked by the operation clock pulse counter 130.

It will be noted that the blocking of the operation control 110 may be carried out in another manner. By way of example, it is possible to transmit the logical 1, appearing at the beginning of this interval $T_6$ at the output $Q_6$ of the operation control 110, through the delay member 144 to the clock enable input of the operation control 110 and to block the latter in this manner. Thus the operation clock pulse counter 130 can be omitted.

Only the outputs $Q_4$, $Q_5$, $Q_9$ and $C_{out}$ of the Johnson counter 120 are used. The signals appearing here during the interval $T_6$ are illustrated in FIG. 10 in the fifth, fourth, third and second lines from the bottom.

The first pulse appearing at the output $Q_4$ of the Johnson counter 120 remains ineffective since the AND gate 145, to which it is fed, is blocked by the flip-flop 122 which has been reset since the beginning of the cable section cycle. The pulse immediately following this first pulse at the output $Q_5$ of the Johnson counter 120, which is transmitted through the OR gate 146 to the reset input of the flip-flop 122, is ineffective since this flip-flop is already reset. The next subsequent pulse appearing at the output $Q_9$ of the Johnson counter 120 is blocked by the AND gate 147 which is connected through an OR gate 149 to the outputs $Q_1$ and $Q_2$, which are at logical O, of a measuring point clock pulse counter 148 which is also reset.

The next pulse appearing at the output $C_{out}$ of the Johnson counter 120 arrives at the clock input of the flip-flop 122 whose D input is always at logical 1 so that now the flip-flop is set at its Q output to logical 1, as is illustrated in the bottom line of FIG. 10. The buffer 150 connected to this Q output, which in the embodiment of FIG. 9 is an inverting buffer, turns at this time with its output signal to logical 0, and this initiates the first measuring point clock pulse on the line 17. (The buffer 150 must be non-inverting for the embodiment example of the selectable circuits 15 and the measuring points 5 illustrated in FIG. 2).

This first measuring point clock pulse causes all measuring point flip-flops 25 and 45 to receive at their Q outputs the information present at their D inputs.

In this case, only one single D flip-flop 25 or only one single group of D flip-flops 45 has a logical 1 at its D input, namely the flip-flop or flip-flop group of the first measuring point 5 following the selected selectable circuit 15. All other D flip-flops are, and remain, at logical 0 at their Q outputs.

The D flip-flop 28 of the selected selectable circuit 15 receives, the first measuring point clock pulse through the OR gate 35 and receives the logical 0 present at its D input, so that only one single logical 1 is shifted into the subsequent shift register.

The next pulse appearing at the output $Q_4$ of the Johnson counter 120 passes through the AND gate 145, which is now open, and continues, on the one hand, to the clock pulse input of the measuring point pulse counter 148 whose count is thus increased by one, and, on the other hand, to the input of an AND gate 154, at whose other input the signal emitted through the line 93 by the comparator 87 is present, and which signal remains at logical 0 as long as the comparator fails to detect that a pseudo measuring point has been reached whose sensor 20 is replaced by a metal film resistor 29. Since at the present time only the first measuring point of the cable section in question is sensed and since the cable section in question comprises at least one measuring point provided with a sensor 20, the AND gate 154 is blocked and does not release any signal at its output.

The next pulse appearing at the output $Q_5$ of the Johnson counter 120 passes through the OR gate 146 to the reset input of the flip-flop 122, at whose Q output a logical 0 will therefore appear again. The first measuring point clock pulse is thus completed.

The next pulse appearing at the $Q_9$ output of the Johnson counter 120 can now cause, via the AND gate 147 and the line 85, the sample and hold circuit to receive the measuring value emitted by the operational amplifier 106, since a logical 1 is present at the $Q_1$ output of the measuring point clock pulse counter 148 which opens the AND gate 147 through the OR gate 149. The former now remains open until the measuring point clock pulse counter 148 is again reset to zero, since one of the two outputs $Q_1$ and $Q_2$ will always exhibit a logical 1 in the case of all other count states.

The distance as to time between this pulse appearing at the $Q_9$ output of the Johnson counter 120 for controlling the sample and hold circuit 82 and the previous pulse at the $C_{out}$ output of the Johnson counter 120, which has produced the effective leading edge of the corresponding measuring point clock pulse and thus has caused the switch arrangement 21 contained in the sensed measuring point 5 to be closed, is so large that this switching arrangement 21 is with certainty in the steady state, i.e. at its lowest resistance value, and thus guarantees that a reliable measuring value will be received in the sample and hold circuit 82.

The production of the measuring point clock pulses is now continued until either the comparator 87 indicates that a pseudo measuring point has been reached, whereby the AND gate 154 emits a signal to the OR gate 151 when a pulse occurs at the $Q_4$ input of the Johnson counter 120, or until a decoder 152 connected to the outputs $Q_1$ to $Q_n$ of the measuring point clock pulse counter 148 detects that the maximum number of measuring points present per cable section has been reached and transmits a corresponding signal to the OR gate 151. In both cases, a reset mono-flop 153 is caused by the signal emitted by the OR gate 151 to emit a reset pulse which sets all units of the switch arrangement illustrated in FIG. 9, with the exception of the address counter 115, back to the reset state via the OR gate 129, as this has been already described hereinbefore for the pulse emitted by the start mono-flop 124. Now the next cable section cycle can begin.

It is only the address counter 115 which may not be set back since it has to increase its count by one in the next time interval $T_1$ occurring, i.e. when a logical 1 appears at the output $Q_1$ of the operation control 110, in order to provide the address for the next selectable circuit 15 to be selected.

The cable section cycles just described are continued until a decoder 153 connected downstream of the address counter 115 detects that the number contained in the address counter 115 is equal to the number of cable sections present in the whole measuring arrangement. Then the decoder 153 emits a corresponding signal through the OR gate 128, through which the start mono-flop 124 is caused to emit a reset pulse which, as in the case of switching on the whole arrangement, now also sets the address counter 115 to zero, so that at the next clock signal received by this address counter 115, the address of the first selectable circuit 15 is produced.

The following components may be used for the circuit arrangement illustrated in the Figures, these components being on supply with the type-designations indicated, e.g. from the companies Motorola, RCA, Analog-Devices and Datelec:

| | |
|---|---|
| Inverting Schmitt triggers 38, 39, 40, 44, 46 | MC 14584 BCP |
| Inverting buffers 41, 50, 140, 141, 150 | MC 14049 BCP |
| D flip-flops 28, 45, 70, 71, 122, 132 | MC 14013 BCP |
| 3-out-of-5 majority logic circuits 48, 72, 73 | MC 14530 BCP |
| Analog switches 21, 52 to 57, 61–63 | MC 14016 BCP |
| Programmable countdown counters 30, 117, 130 | MC 14526 BCP |
| OR gates 35, 36, 37, 128, 129, 136, 139, 146 149, 151 | MC 14071 BCP |
| AND gates 133, 134, 135, 138, 145, 147, 154 | MC 14081 BCP |
| Mono-flops 124, 153 | MC 14528 BCP |
| Johnson counters 110, 113, 120 | MC 14017 BCP |
| Countup counters 115, 148 | MC 14520 BCP |

The aforesaid components are integrated CMOS semi-conductor components, only.

| | |
|---|---|
| Operational amplifiers 81, 97, 103, 106 | AD-741-LN |
| Sample and hold circuit | SHM-IC-1 (Datelec) |

What is claimed is:

1. In an arrangement for measuring variable ambient physical parameters having a plurality of measuring stations connected by means of a multiwire cable to one another and to a remote control and measuring centre, each of said measuring stations comprising at least one sensor (20) which changes its electric resistance dependent on the physical ambient parameter, at least one switch arrangement (21) which in its closed state connects the sensor via a first wire (22) of the cable to a common energy source from and via a second wire (23) back to the control and measuring centre (2), and a control circuit (25, 45) which closes the switch arrangement (21) for a short period for each measuring operation and then opens it, said stations being arranged along said cable in a plurality of sections (7–13), each section being provided with a selectable circuit (15) independently activated over a third wire (16) by the control and measuring centre (2), said control circuits (25) of each of said measuring stations within each cable section being triggered by said control and measuring centre sequentially one after another for closing the corresponding switch means (21) only after activation of the corresponding selectable circuit (15), by means of a clock signal commonly transferred by a fourth wire (17) to all measuring stations from the control and measuring centre (2).

2. The system according to claim 1, wherein the control circuit of each measuring station (5) includes a flip-flop arrangement (25, 45), and the closing of the corresponding switch arrangement (21) is effected by the appearance of a predetermined logic level at least at one output of the corresponding flip-flop arrangement (25, 45), said flip-flop arrangements (25, 45) in each cable section (7 to 13) being connected together in the manner of a shift register into whose first stage the predetermined logic level can be inputted when the selectable circuit (15) is activated and shifted further from stage to stage by the clock signal transmitted from the control and measuring centre (2).

3. The system according to claim 2, wherein a reset signal is transmitted on a fifth wire (32) from the control and measuring centre (2) to the flip flop arrangement (25, 45) to cause opening of any closed switch arrangement (21).

4. The system according to claim 3, wherein an initiating stage of the shift register comprises a flip-flop arrangement (28) located in the selectable circuit (15).

5. The system according to claim 4, wherein the initiating flip-flop arrangement (28) is a D flip-flop which, after activation of the selectable circuit (15), is controllable by signals emitted by the control and measuring centre, such that for exactly one clock signal pulse, the predetermined logic level which is to be shifted appears at the output of the D flip-flop (28) said output being connected to the flip-flop arrangement (25, 45) of the following measuring station.

6. The system according to claim 3, wherein the flip-flop arrangement of each measuring station (5) comprises multiple D flip-flops (45) whose clock inputs and reset inputs are triggerable in parallel by the corresponding signals of the control and measuring centre (2), and whose Q outputs are connected to the inputs of a majority logic arrangement (48) provided in the control circuit of the respective measuring station (5), said majority logic arrangement (48) controlling the switch arrangement (21) of the respective measuring station (5) by its output signals.

7. The system according to claim 6, wherein the data inputs of the multiple D flip-flops (45) of each measuring station (5) not directly following the selectable circuit (15) are each individually controllable over a section (26) of additional wires by one output of the majority logic arrangement (48) of the previous measuring station (5).

8. The system according to claim 7, wherein the data inputs of the multiple D flip-flops (45) of the measuring station directly following the selectable circuit (15) are commonly controllable over a section (26) of the sixth wire of the cable (1), by the Q output of the D flip-flop (28) of the selectable circuit (15).

9. The system according to claim 7, wherein the multiple flip-flop arrangement (45) of each measuring station comprises five D flip-flops operable in parallel, and the majority logic arrangement (48) consists of five 3-out-of-5 majority logic gates.

10. The system according to claim 6, wherein the switch arrangement (21) of each measuring station (5) includes a plurality of switches (52 to 57) which are connected in at least two parallel groups between the first and second wires (22, 23), each of the groups comprising a multiple of switches which are in series with respect to one another.

11. The system according to claim 10, wherein the switch arrangement (21) comprises two parallel groups, each of which comprises three switches (52 to 57) connected in series, each of the switches (53, 54, 57) of one group and one of the switches (52) in the other group being individually controllable by one output of the majority logic arrangement (48), while the control inputs of the two remaining switches (55, 56) are commonly connected to the fifth output of the majority logic arrangement (48).

12. The system according to claim 2, wherein at the measuring station (5) whose flip-flop arrangement (25, 45) forms the last stage of the shift register, the sensor (20) is replaced by a fixed resistor (29) whose resistance value differs from the resistance values which are accepted by the sensor (20) in the provided measuring range, and in the control and measuring centre (2), a circuit arrangement (87, 150, 153) is provided which triggers the selection of a new cable section (7 to 13) after the appearance of a measuring value corresponding to this clearly differing resistance value.

13. The system according to claim 1, wherein an address information is sent to all selectable circuits (15) from the control and measuring centre (2) on a wire (16) of the cable 1 and wherein each selectable circuit 15 includes a decoding device (30) which detects address information, and which compares said information with a fixedly stored address and which produces an activating signal when both coincide.

14. The system according to claim 13, wherein the decoding device is a down counter (30) having the address of its selectable circuit (15) fixedly applied at its programming inputs and being preset to a corresponding value by a signal emitted by the control and measuring centre (2) prior to the emission of the address information and having a clock input connected to the third wire (16) which conducts the address information in the form of a pulse chain having a predetermined number of pulses, the overflow output of said down counter (30) being connected to the data input of the initiating D flip-flop (28) providing the logic level for further shifting by the shift register when the count "zero" has been attained.

15. The system according to claim 14, wherein a delay member (34) is connected between the overflow output of the down counter (30) and the data input of the initiating D flip-flop (28), and the PE input of the down counter (30) and the clock input of the D flip-flop (28) are commonly triggered by a pulse emitted by the control and measuring centre (2) on the fifth wire (32) after emission of the address information.

16. The system according to claim 15, wherein the clock input of the initiating D flip-flop (28) is connected to the fifth wire (32) via one input of an OR gate (35), the second input of which receives the clock pulses emitted by the control and measuring centre (2) through the corresponding fourth wire (17).

17. The system according to claim 15 wherein, the flip flop arrangement of each measuring station (5) comprises one D flip-flop (25) and the reset signal is provided over the fifth wire (32) to the reset input of each D flip-flop (25) to the PE input of a down counter (30) and to the clock input of the initiating D flip-flop (28) of each selectable circuit (15), and the clock signal is provided over the fourth wire (17) to the clock input of each of said D flip-flops (25) and the D input of each of said flip-flops (25) is connected through a section (26) of a sixth wire of the cable (1) to the Q output of the D-flip-flop (28, 25) of the preceding stage in the shift register, and the Q output of each of said D flip-flops (25) is connected to at least the control input of the switch arrangement (21) of its corresponding measuring station (5) to cause said switch to close after application of a logical (1) is obtained.

18. The system according to claim 1, wherein the switch arrangements (21) are formed by contactless semiconductor switches.

19. The system according to claim 18, wherein the switch arrangements (21) of a plurality of measuring stations (5) are combined to form sub-groups, each switch arrangement of said sub-group being connected by the terminal, which is not connected to the corresponding sensor (20), to a common section (60) of a wire of the cable (1), which section (60) is connected via a switch arrangement (61), to one of the first and second wires (22 or 23) to form a first hierarchic level.

20. The system according to claim 19, wherein the switch arrangements (61) for the first hierarchic level of a plurality of sub-groups are combined to form groups, connected with their terminals not leading to the corresponding sensors (20), to a common section (62) of a further wire of the cable (1), which section is connected via a switch arrangement (63), to one of the first and second wires (22 or 23) to form a second hierarchic level.

21. The system according to claim 20 wherein each measuring station (5) includes three switch arrangements connected in series, the first (21) belongs to the lowest, the second (61) belongs to the middle and the third (63) belongs to the highest hierarchic level, and in each cable section (7 to 13), in the case of the first, $(n^2+1)$-th, $(2n^2+1)$-th, etc. measuring station (5) following the respective selectable circuit, the free terminal of the switch arrangement (63) of the highest hierarchic level is connected via a first connection (68) to one of the first and second wires (22 or 23); the connection point between the switch arrangement (63) of the highest hierarchic level and the switch arrangement (61) of the middle hierarchic level is connected via a second connection (67) to the corresponding wire section (62); and the connection point between the switch arrangement (61) of the middle hierarchic level and the switch arrangement (21) of the lowest hierarchic level is connected via a third connection (66) to the corresponding cable section (60), and in the case of each $(n+1)$-th, $(2n+1)$-th, $(3n+1)$-th, etc. measuring station (5), the first (68) of these three connections (66, 67, 68) is omitted, but the second (67) and the third (66) is provided, and in the case of all remaining measuring stations, only the third connection (66) is provided, while the first (68) and the second (67) are omitted.

22. The system according to claim 21, wherein each measuring point (5) also includes a control circuit for the switch arrangements (61, 63) of the middle and higher hierarchic levels, said controls circuit comprising in each case at least one flip-flop arrangement (70, 71).

23. The system according to claim 22, wherein the flip-flop arrangements (70, 71), which control the switch arrangements (61, 63) of the middle and higher hierarchic levels, are each formed by multiple D flip-flops operated in parallel, whose output signals are transmitted to the control inputs of switch arrangements (61, 63) via majority logic arrangements (72, 73).

24. The system according to claim 23, wherein the data and reset inputs of the D flip-flops, which form the flip-flop arrangements (70, 71) for the switch arrangements (61, 63) of the middle and higher hierarchic levels, are connected to the data and reset inputs of the D flip-flops which form the flip-flop arrangement (45) for the switch arrangement (21) of the lowest hierarchic level, and that the clock inputs of the D flip-flops (71) for the switch arrangements (63) of the highest hierarchic level are triggered by group clock signals coming from the control and measuring centre on a separate wire (77) of the cable (1); and the clock inputs of the D flip-flops (70) for the switch arrangement (61) of the middle hierarchic level are triggered by sub-group clock signals coming from the control and measuring centre (2) on a further wire (75) of the cable (1).

25. The system according to claim 1, wherein the energy source, is a constant current source (80) arranged in the control and measuring centre (2).

26. The system according to claim 25, wherein the constant current source (80) is formed by a circuit arrangement (97, 98, 99, 100, 101) which measures the current flowing back through the second wire (23) from the sensor (20) and which adjusts it to a predetermined, constant value.

27. The system according to claim 26, wherein the circuit arrangement adjusting the measuring current is formed by an operational amplifier (97), having a first input connected through a voltage divider (98, 99, 100) to a fixedly predetermined reference voltage, a second input connected to the second wire (23) carrying back the measuring current from the sensors (20) and grounded via a fixed resistor (101), and the output of said operational amplifier feeds the first wire (22) of the cable (1) carrying the measuring current to the sensors (20) with a current adjusted to such a value that it produces the same voltage drop at the grounded fixed resistor (101) when flowing back through the second wire (23) as the first input of the operational amplifier (97) receives at the voltage divider (98, 99, 100).

28. The system according to claim 27, including a differential amplifier (81) having a high common-mode signal rejection capacity producing a measuring value to be further processed from the voltage difference between the output and the second input of the operational amplifier (97) and an impedance converter (103) having the amplification "one" connected between the measuring point (MP2) connected to the second input of the operational amplifier (97) and the corresponding input of the differential amplifier (81), the output resistance of said impedance converter (103) corresponding approximately to the output resistance of the operational amplifier (97).

29. The system according to claim 28, including a differential member (106) connected downstream of the differential amplifier (81) said differential member having high common-mode signal rejection, and subtracting a fixedly predetermined amount from the measuring signal.

30. The system according to claim 25, including an intermediate memory (82) receiving the measuring result before further evaluation takes place, said intermediate memory (82) being controllable by a circuit unit (120) producing the measuring station clock signal, such that it will only accept the measuring result if the switch arrangement (21) of the respective sensor (20) is completely closed.

* * * * *